United States Patent Office 3,842,016
Patented Oct. 15, 1974

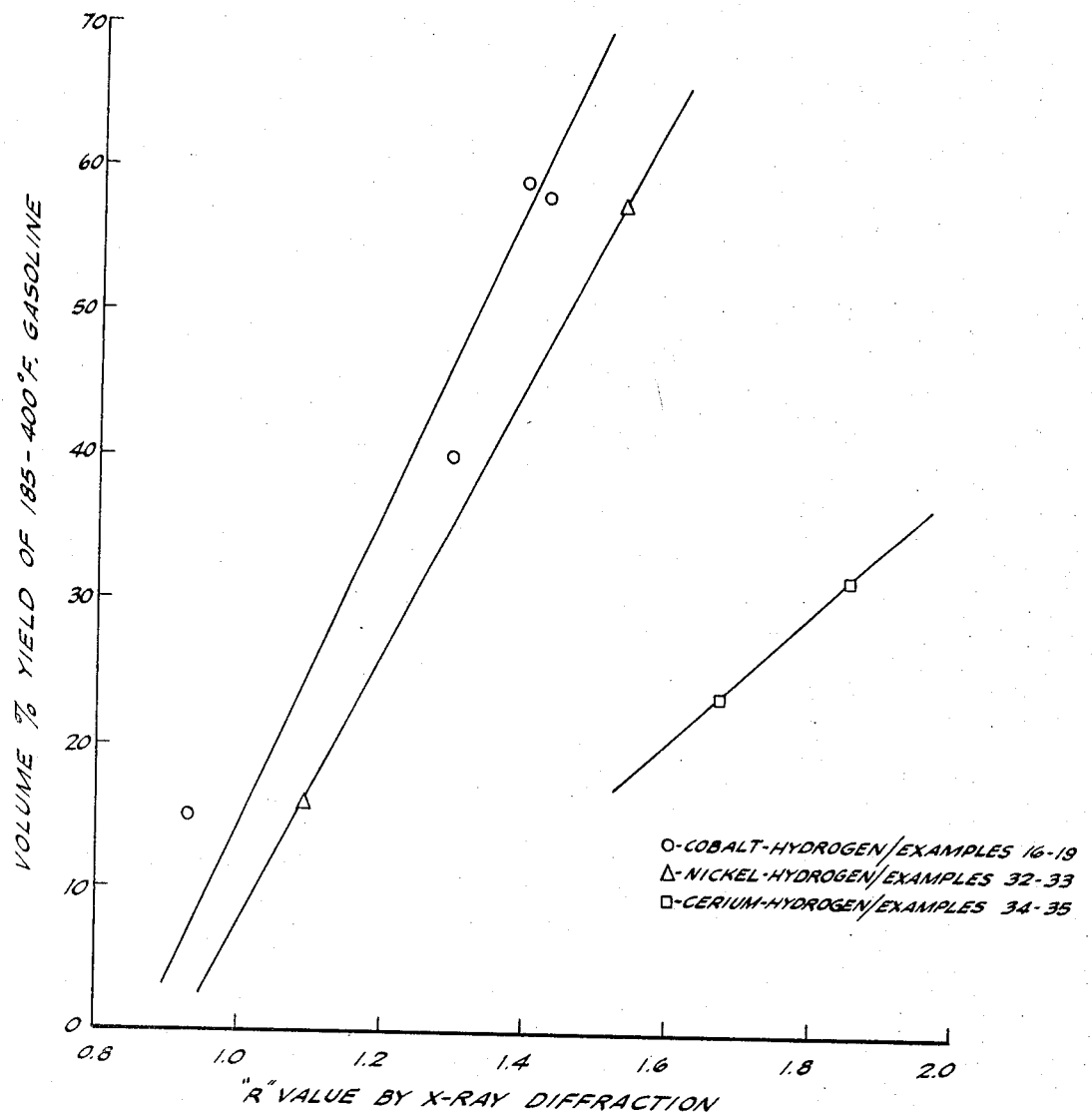

3,842,016
THERMALLY ACTIVATED CRYSTALLINE ALUMINOSILICATES
Dean Arthur Young, Yorba Linda, Calif., assignor to Union Oil Company of California, Los Angeles, Calif.
Continuation of abandoned application Ser. No. 72,351, Sept. 15, 1970, which is a continuation-in-part of application Ser. No. 17,974, Mar. 9, 1970, now Patent No. 3,706,694, which is a continuation-in-part of application Ser. No. 761,321, Sept. 20, 1968, which in turn is a continuation-in-part of application Ser. No. 681,561, Nov. 11, 1967, both now abandoned. This application Mar. 12, 1973, Ser. No. 340,179
Int. Cl. B01j 11/40
U.S. Cl. 252—455 Z                                17 Claims

ABSTRACT OF THE DISCLOSURE

The physical form, hydrothermal stability and activity, particularly hydrocarbon conversion activity, of crystalline aluminosilicates are markedly improved by accelerated thermal activation. The aluminosilicate is rapidly heated to the selected activation temperature, e.g., in excess of about 900° F. in a period of not substantially in excess of about 30 minutes.

---

This application is a continuation of my copending application Ser. No. 72,351 filed Sept. 15, 1970 now abandoned, which in turn was a continuation-in-part of my prior applications Ser. Nos. 17,974 filed Mar. 9, 1970, now U.S. Pat. No. 3,706,694, 761,321 filed Sept. 20, 1968 and 681,561 filed Nov. 11, 1967 now abandoned. My copending application Ser. No. 72,377, now U.S. Pat. No. 3,783,123 is also related to the subject matter of this application.

BACKGROUND

The unique physical and chemical properties of crystalline aluminosilicates continue to engender considerable interest for their utilization in a wide variety of applications ranging from selective physical separation to some of the most complicated, little understood catalytic chemical phenomena. It is apparent from the many disclosures of the prior art that the substantial utility of zeolitic aluminosilicates in a myriad variety of physical and chemical processes has promoted the expenditure of considerable research and development effort for the purpose of developing zeolites of even greater effectiveness for any given objective. These efforts, both past and continuing, are also testimony to the fact that there remains considerable room for improvement in the essential qualities of zeolites presently available.

In the field of hydrocarbon conversion catalysts the mere ability of a zeolite to catalyze cracking, hydrocracking, isomerization, alkylation, hydrofining, dehydrogenation, polymerization, etc., does not necessarily establish the commercial significance of a given zeolite. In any hydrocarbon conversion process there are usually a plurality of mechanisms through which a feedstock can be converted to a number of products. The ability of a catalyst to accentuate a specific mechanism favorable to the production of the most desired product while minimizing "side" reactions leading to the formation of undesired products is one aspect of zeolite catalysis that bears continued investigation. The tolerance of such catalysts to feed impurities or poisons in the feed, to the feed itself, or to deleterious substances resulting from conversion of the feedstock to catalyst inhibiting substances, e.g., carbonaceous deposits, is also the subject of considerable research effort. Yet another area of investigation is that involving the qualities of zeolites which render them tolerant to process conditions to which they are necessarily exposed in any given application. Needless to say, recognition of the many objectives involved in the acquisition of a suitable zeolite and the great variety of parameters at the investigator's disposal which may or may not influence a specific desired quality have led to the development of a complex technology in which there is yet considerable room for improvement.

I have now discovered that substantial improvements in the several physical and chemical properties of crystalline aluminosilicates can be achieved by employing a unique thermal activation procedure. Several of the more significant qualities influenced by this thermal activation are hydrothermal and acid stability and catalytic activity for several hydrocarbon conversion mechanisms such as denitrogenation, catalytic cracking, desulfurization, hydrocracking, hydrogenation and the like. I have also discovered that the observed higher tolerance to processing and regeneration conditions and increased catalytic activity in the conversion of organic, particularly hydrocarbon, compounds are accompanied by identifiable modifications in certain inherent characteristics. One such modification in the aluminosilicate structure is evidenced by a notable shift in several of the characteristic Miller indices derived from X-ray spectra. For example, I have observed that the described thermal activation of faujasite zeolites results in a relative shift in the (311), (533), (511) and (440) Miller indices corresponding to the 7.4, 3.75, 4.74 and 4.35 A. spacings respectively, such that the ratio of the sum of the (311) and (533) indices to the sum of (511) and (440) index intensities is substantially increased by a degree not observed when employing previously available thermal activation procedures. Although this Miller index ratio, herein referred to as the characteristic "R" value, is also known to be a function of the cation form of the aluminosilicate, it nevertheless definitely indicates a transition in one or more characteristics of the aluminosilicate accompanying this thermal activation which is not an observed corollary effect of previously available calcination methods. I have also discovered that there exists a correlation between hydrofining and hydrocracking activity and the above-described "R" value which indicates its utility for predicting activity in a given aluminosilicate having a specified cation form.

The absolute "R" value and activity of any given catalyst will depend not only upon the inherent characteristics of the original aluminosilicates per se, such as zeolite Y, but will also depend upon the cationic form of that zeolite. As is often the case in complex chemical and physical systems, a form of characterization such as that provided by these "R" values is not applicable to all species within a generic class without some modification in view of inherent differences between the several species. The Miller indices which reflect the modifications produced during the rapid calcination will not be the same for all forms of zeolites. For example, the absolute magnitude of the "R" value ascertained for cerium-X and -Y zeolites respectively differ substantially although they still provide an indication of the effectiveness of thermal activation and could be correlated with the activity of each respective catalyst.

The Miller indices selected to establish the "R" value for each respective catalyst and to provide an indication of the physical and/or chemical changes rendered in those compositions, were chosen due to the substantial variation and amplitude observed at those frequencies. Some response was also observed at several other frequencies. However, the variation in those components of the spectra were not substantial and did not appear to significantly reflect physical or chemical change. The zeolite characteristics to which these changes in "R" value and X-ray spectra are attributable have not yet been ascertained with certainty.

Several characteristics could be responsible for the observed effects. Of these, the most probable are (1) a shift in location or nature of ionic coordination between the cations and the aluminosilicate, (2) a shift in the location and/or nature of coordination between the hydroxyl units and the active sites of the aluminosilicate and (3) a controlled rearrangement of the physical crystalline structure per se. Whatever the nature of the change reflected by the observed X-ray spectra it so modified the characteristics of the aluminosilicate that the resultant compositions were much more stable to hydrothermal and acidic environments and exhibited markedly increased activity toward organic compound conversion mechanisms.

It is therefore one object of this invention to provide an improved crystalline aluminosilicate. It is another object of this invention to provide a method for thermally activating crystalline aluminosilicates. Yet another object of this invention is the provision of a zeolite having improved hydrothermal and/or acid stability and hydrocarbon conversion activity. It is yet another object of this invention to provide an improved catalyst for hydrocracking, catalytic cracking, hydrogenation, denitrogenation and desulfurization. Yet another object of this invention is a provision of an improved method for preparing hydrocarbon conversion catalysts.

In accordance with one embodiment of this invention the activity and thermal stability of crystalline aluminosilicates are markedly improved by thermal activation upon heating to a temperature of at least about 900°F. and below the thermal decomposition temperature within a period not substantially in excess of about 30 minutes.

In accordance with another embodiment of this invention the chemical activity and hydrothermal and acid stability of crystalline aluminosilicates are improved by heating the aluminosilicates to a temperature within the range of about 1200 to about 1800° F. and below the thermal decomposition temperature within a period of less than about 20 minutes.

The drawing is a graphic presentation of the results of several examples illustrating the relationship of aluminosilicate "R" value and calcination effect on hydrocarbon conversion activity.

It is generally desirable that the aluminosilicate be rapidly heated to a temperature of at least about 1000° F., preferably about 1200 to about 1800° F. within a very short period of time. The most beneficial results are obtained when a substantial temperature gradient is traversed in a rather short period, i.e., about 30 minutes or less. For that reason it is usually desirable to commence heating of the zeolite at a temperature below about 500° F. and bring the aluminosilicate to the desired activation temperature within about 30 minutes or less, preferably within 20 minutes or less. The phenomena to which the changes in catalyst properties are attributable are not known with certainty. However, one possible explanation for these effects might be that either chemical or physical degradation of the zeolite occurs at relatively low temperatures, e.g., below about 1000° F. The consequences of such degradation would presumably be eliminated, or at least minimized, by rapidly traversing the lower or intermediate temperature ranges at which the undesirable reactions occur. This explanation is somewhat passive in that it suggests the avoidance of undesirable conditions. However, it is also possible that the effect of the described treatment is more direct. Thus the advantages of this approach might be attributable to a positive effect promoted by the rapid heating sequence that is not promoted by more gradual heating.

The average heating rates involved in these procedures are usually on the order of about 30° F. per minute or higher throughout the temperature gradient traversed. However, without benefit of elaborate temperature control systems the lower portion of this temperature range will be traversed much more rapidly than the upper extremity of the high temperature range. In other words, the rate of heating in the earlier stages of the activation procedure will be somewhat greater, e.g., about 50 to about 60° F. per minute, than in the later stages, e.g., about 10 to about 20° F. per minute, due to the diminished temperature differential between the aluminosilicate and the immediate environment.

It is also presently preferred that the upper temperature extreme to which the aluminosilicate is subjected be within about 200° F. of the thermal decomposition temperature of the selected aluminosilicate. It is of course undesirable to exceed the thermal decomposition temperature in that the crystallinity of aluminosilicate is substantially destroyed beyond that point. However, it is presently believed that the more substantial improvement is the several desired qualities can be achieved by approaching that limiting extreme temperature as closely as possible without destroying the necessary structural features of the zeolite. Preferred activation temperatures for several cationic forms of zeolite Y are shown in the following table.

| | °F. |
|---|---|
| Sodium, potassium | 1200–1400 |
| Amonium, hydrogen, decationized | 1400–1600 |
| Magnesium, calcium | 1400–1600 |
| Iron, nickel, cobalt | 1300–1500 |
| Manganese, copper, zinc | 1400–1600 |
| Cerium, lanthanum | 1400–1600 |

After the aluminosilicate has reached the specified upper temperature above about 900° F. it should be retained at that temperature for a period sufficient to complete the decomposition of thermally decomposable salts contained in the aluminosilicate and dehydration of the zeolite structure. In conventional calcination systems wherein a substantial period of time, i.e., about 2 hours, is involved in bringing the aluminosilicate to the desired activation temperature, the necessary mechanisms of salt decomposition and dehydration are substantially effected during the heating up period. However, when the aluminosilicate is brought to the calcination temperature very rapidly, i.e., in less than 15 minutes, complete expulsion of water and decomposition products may not be achieved due to mass transfer limitations. As a result, it is generally preferred to retain the zeolite at the prescribed activation temperature for at least about 10 minutes and preferably at least about 20 minutes before cooling.

The physical form of the aluminosilicate employed in these procedures can vary substantially although certain advantages are achieved by reducing the particle size of the aluminosilicate to facilitate rapid heat transfer. For example, the described improvements in stability and activity can be obtained by calcining the aluminosilicate in the form of 1/16-inch pellets. However, it is presently preferred that the aluminosilicate be in the form of a relatively fine powder during the thermal activation step in order to minimize the difficulty involved in rapidly approaching the desired elevated temperatures.

The type of apparatus employed to effect this purpose is not in itself a critical consideration although certain types of apparatus accentuate heat transfer. For example, successful calcination can be affected in a preheated box muffle furnace containing a static bed of aluminosilicate particles or powder supported on a grid or plate. However, when using this type of apparatus it is preferable to provide for the circulation of heating air through the aluminosilicate during heating so as to facilitate heat transfer. Consequently, the aluminosilicate articles should usually be suspended on a gas permeable grid or screen.

However, the rapid heating step can be accomplished much more expeditiously by a fluid calcination system. In one embodiment of that system a powdered aluminosilicate is injected into a preheated air stream and passed through a preheated fluidized furnace maintained at a temperature sufficient to rapidly bring the aluminosilicate to the desired temperature. The flow rate through such a system can be controlled such that overheating of any particular aluminosilicate particles can be substantially avoided by simply increasing the flow rate of the process stream. Consequently, the wall temperature of the furnace can be maintained at a point substantially above that of the extreme calcination temperature thereby facilitating rapid heating. A temperature gradient can also be maintained along the flow path through the fluidized furnace such that a relatively constant temperature gradient can be maintained between the aluminosilicate particles and the immediate environment. However, since heating can be accomplished very rapidly by this procedure, i.e., on the order of 0.5 seconds or less, it is sometimes desirable to retain the heated aluminosilicate at the prescribed activation temperature subsequent to its exit from the furnace for a period sufficient to effect thermal decomposition of entrapped salts and dehydration of the zeolite. Contact times of at least about 10 minutes and preferably at least about 20 minutes are generally sufficient for this purpose. However, there is no substantial advantage to be achieved by retaining the aluminosilicate at these elevated temperatures for excessive periods of time. On the contrary, extensive aging at these temperatures can be detrimental particularly to the desirable crystalline structure. For these reasons, it is presently preferred that the temperature of the aluminosilicate be substantially reduced within about 4 hours.

The aluminosilicates employed in the process of this invention should be highly crystalline materials containing a substantial proportion of tetra-coordinated aluminum atoms, each associated through four oxygen atoms with adjacent silicon atoms in the crystalline matrix. The electronegative character of such tetra-coordinated atoms has been discussed extensively by other investigators and need not be considered in detail herein.

The tetra-coordinated aluminum atoms of the aluminosilicates suitable for use in the process of this invention are usually associated with mono-valent alkali metal cations, e.g., sodium, due primarily to the method of preparation of most synthetic aluminosilicates. When sodium is present in the original aluminosilicate its concentration should not exceed 6 weight-percent, determined as sodium oxide, and should preferably be less than about 3 weight-percent based on the oxide. The lower sodium content is preferred due to the greater degree of thermal and acid stability of the lower sodium zeolites. Yet another characteristic of the initial aluminosilicates relevant to their suitability in this process is the $SiO_2/Al_2O_3$ ratio. The low silica zeolites generally exhibit lower tolerance to thermal degradation and are therefore less preferred in the process of this invention due to the necessity of exposing the aluminosilicate to elevated temperatures. However, essentially any aluminosilicate having the ability to retain a substantial proportion of its original crystallinity on exposure to the conditions herein described is suitable as a starting material in this process. As a general rule the $SiO_2/Al_2O_3$ ratio of the aluminosilicate should be greater than about 2 and preferably greater than about 3. The degree of crystallinity of the starting material can also vary substantially although zeolites containing only a minor proportion of crystalline structure on a weight basis are generally less desirable due to their lower activity and ion exchange capacity. Therefore, as a general rule, the aluminosilicates should contain at least about 30 weight-percent crystalline structure, preferably at least about 50 weight-percent.

These qualifications establish a category which encompasses a wide variety of synthetic and naturally occurring crystalline aluminosilicates. Exemplary of the synthetic aluminosilicates are Zeolite X, U.S. 2,822,244; Zeolite Y, U.S. 3,130,007; Zeolite A, U.S. 2,882,243; Zeolite L, Belgium 575,117; Zeolite D, Canada 661,981; Zeolite R, U.S. 3,030,181; Zeolite S, U.S. 3,054,657; Zeolite T, U.S. 2,950,952; Zeolite Z, Canada 614,995; Zeolite E, Canada 636,931; Zeolite F, U.S. 2,996,358; Zeolite O, U.S. 3,140,252; Zeolite B, U.S. 3,008,803; Zeolite Q, U.S. 2,991,151; Zeolite M, U.S. 2,995,423; Zeolite H, U.S. 3,010,789; Zeolite J, U.S. 3,011,869; Zeolite W, U.S. 3,012,853; Zeolite Omega, Canada 817,915 and Zeolite KG, U.S. 3,056,654. Examplary of the naturally occurring aluminosilicates are levynite, dachiardite, erionite, faujasite, analcite, paulingite, noselite, ferrierite, heulandite, scolecite, stibite, clinoptilolite, harmotome, phillipsite, brewsterite, flakite, datolite, chabazite, gmelinite, canrinite, leucite, lazuraite, scaplite, mesolite, ptilolite, mordenite, nepheline, matrolite and sodalite. The faujasite zeolites, both natural and synthetic are particularly preferred due to their relatively large ordered cell structure and ion exchange characteristics. The most readily available synthetic faujasites are zeolites X and Y, examples of which are disclosed in U.S. Pats. 2,882,244 and 3,130,007, respectively. Presently preferred aluminosilicates are Zeolites X, Y, L, T, A, Omega and mordenite.

The presence of sodium in these zeolites is known to diminish their tolerance to thermal and hydrothermal environments. It is therefore presently preferred as previously mentioned that the sodium concentration of the original aluminosilicate be reduced somewhat prior to its exposure to the thermal activation systems described herein. In order to accomplish this purpose, the aluminosilicate is usually subjected to an exchange with a solution containing one or more ions to replace at least a portion of the original sodium with at least one other cation. Numerous cations are suitable for this purpose although the polyvalent metal cations are particularly preferred. Exemplary suitable cations are ammonium, hydrogen and the alkaline earth, rare earth, actanide series, and the Group IV–B, V, VI–B and VIII metal cations. The aluminosilicate can also be in the decationized form prior to thermal activation. The preparation of decationized zeolites is discussed in U.S. 3,130,006. Although any one of these numerous alternatives can be employed, it is presently preferred that at least a portion of the sodium be exchanged out of the zeolite with either ammonium or hydrogen ions, preferably ammonium ions, prior to commencement of the thermal activation. There are several various processes available by which these objectives can be accomplished. These methods are discussed in detail by other investigators and generally involved intimately contacting the sodium form of the aluminosilicate with an aqueous solution of a water soluble ammonium salt such as ammonium nitrate, ammonium sulfate, ammonium chloride, and the like.

When the aluminosilicate is destined for use as a catalyst it is usually desirable to incorporate therein at least one other active component which contributes to the desired activity and/or selectivity. For example, when the zeolite is intended as a hydrocracking or hydrogenation catalyst it is preferable to incorporate a hydrogenation component usually selected from the metals, metal cations, metal oxides and metal sulfides of the Groups IV, VI and VIII of the Periodic Chart. This can be accomplished by any one of several means, such as ion exchange, impregnation, mulling, coprecipitation, cogelation, etc. The active component can be added in the active form although usual procedures involve addition of thermally decomposable metal salts.

The active metal concentrations are usually within the range of about 0.1 to about 40 weight-percent, preferably from about 0.5 to about 20 weight-percent determined as the corresponding oxide. The preferable concentrations of the Group VIII metals, particularly the expensive noble metals, are somewhat lower, being within the range of about 0.1 to about 10 weight-percent, preferably from about 0.2 to about 5 weight-percent determined as the corresponding oxide. These hydrogenation components can be incorporated into the aluminosilicate along with other elements such as the stabilizing metals, i.e., iron, cobalt, and nickel, either before or after the described thermal activation. However, substantial advantages in both stability and activity can be realized by incorporating a Group VIII non-noble metal, particularly nickel or cobalt, prior to activation. These results are best effected by impregnation or ion exchange with an aqueous soluble metal salt solution. Although significant advantage can be achieved with only nominal metal concentrations, it is preferable that the zeolite contain at least 0.5% of the metal determined as the corresponding oxide. It is presently preferred that the remaining hydrogenation components be added to the aluminosilicate following completion of the thermal treatment.

Essentially any method of combination can be employed which affords intimate admixture of the aluminosilicate and the active constituents. The most common procedures are ion exchange and impregnation from aqueous solutions of thermally decomposable water soluble compounds of the active metals. However, as described in my copending application, Ser. No. 669,288, now abandoned I have observed that in some instances it is particularly desirable to combine these several hydrogenation components by a procedure which results in deposition of at least a predominant portion of the hydrogenation component upon the exterior of the aluminosilicate rather than upon the interior adsorption surfaces. This objective is accomplished most expeditiously by intimately admixing, e.g., mulling the powdered zeolite with an insoluble or dry form of the hydrogenation component.

In several hydrocarbon conversion systems for which the catalysts of this invention are particularly adapted it is usually preferred that the active metal constituents of the aluminosilicate be converted, at least in part, to the corresponding sulfides prior to contacting with hydrocarbon feed at reaction conditions. Exemplary of systems in which this expedient is particularly advantageous are those involving hydrofining, i.e., denitrogenation and desulfurization, and hydrocracking. The active metal components, e.g., the Group VI-B and VIII metals or metal oxides can be sulfided by any one of several available techniques. Most of these approaches involve contacting the metal-containing aluminosilicate with hydrogen sulfide, carbon disulfide, elemental sulfur or similar sulfur donors at ambient or slightly elevated temperatures either in the presence or absence of hydrocarbons.

As previously mentioned, the catalysts subject to these thermal activation procedures have markedly superior activity for promoting the conversion of organic compounds particularly hydrocarbon compounds. They are particularly suited for promoting the mechanisms involved in hydrocracking, hydrogenation, catalytic cracking, dehydrogenation, isomerization and hydrofining, e.g., denitrogenation and desulfurization. Hydrocarbon feedstocks usually employed in such systems are those boiling above about 200° F., usually within the range of about 300 to about 1300° F. Hydrofining feeds usually comprise at least about 200 p.p.m., and sometimes up to 3 weight-percent nitrogen as organonitrogen compounds.

Hydrocracking is usually promoted by contacting the hydrocarbon feed at a temperature of at least about 500° F., usually within a range of about 600 to about 900° F. in the presence of hydrogen. Hydrogen concentrations are usually at least about 500, preferably about 2000 to 20,000 standard cubic feet per barrel. Liquid hourly space velocities (LHSV) are usually within a range of about 0.1 to about 10, preferably about 0.3 to about 8, while reaction pressures are generally about 500 to about 3,000, preferably 1500 to about 2500 p.s.i.g.

Catalytic cracking operations are preferably carried out at temperatures of 850–1100° F., space velocities of 0.5 to 10 volumes of liquid feed per volume of catalyst per hour, and at relatively low pressures below about 200 p.s.i.g., usually about 0–50 p.s.i.g. Preferred feedstocks include gas oils and heavy naphthas, deasphalted crude oil residua, etc., with gasoline being the principal desired product. Preferred catalysts for catalytic cracking comprise hydrogen and/or polyvalent metal zeolites having silica/alumina mole-ratios between about 3.0 and 12. If desired the crystalline zeolite may be incorporated into a matrix of silica-alumina cogel.

Dehydrocyclization reactions are carried out under substantially the same conditions as those indicated above for catalytic cracking, employing as primary feedstocks paraffin hydrocarbons, preferably normal paraffins, having at least 6 carbon atoms, e.g., n-hexane, n-heptane, n-octane and the like, the corresponding products comprising mainly benzene, toluene, xylenes and the like. Preferred dehydrocyclization catalysts comprise zeolites wherein the ion exchange capacity is satisfied mainly by metals of Group IIA and/or IIB, e.g., magnesium, calcium, strontium, zinc and the like. Manganese, iron, cobalt and nickel zeolites may also be employed. In all cases, it is preferred to incorporate between about 0.1 percent and 20 percent by weight of one or more hydrogenating metals into the catalyst, preferably the metals of Groups VI-B and/or VII, e.g., nickel, palladium, platinum, molybdenum, etc.

Dehydrogenation reactions are carried out under the same general conditions described above for catalytic cracking, and the preferred catalysts are similar to those described above for dehydrocyclization reactions. Substantially any paraffinic or alkyl aromatic hydrocarbon may be dehydrogenated to corresponding unsaturated compounds. For example, ethane may be converted to ethylene, propane to propylene, butane to butene, cyclohexane to benzene, methyl cyclohexane to toluene, ethylbenzene to styrene, etc.

Reforming operations are preferably carried out at temperatures of about 800°–1000° F., hydrogen pressures ranging between about 100 and 400 p.s.i.g., and liquid hourly space velocities of about 0.5–5. Preferred feedstocks comprise straight run and/or cracked naphthas boiling in the range of about 200°–450° F., while the preferred catalysts comprise Group VIII noble metal-promoted zeolites wherein the ion exchange capacity is satisfied primarily by Group IIA and/or Group IIB metals, e.g., magnesium, calcium, strontium, zinc and the like. Hydrogen/oil ratios may range between about 500–10,000 s.c.f./B.

Isomerization reactions are carried out under conditions similar to those described above for reforming, using somewhat more acidic catalysts. Olefins are preferably isomerized at temperatures of 500°–900° F., while paraffins, naphthenes and alkyl aromatics are isomerized at temperatures of 700°–1000° F. Particularly desirable isomerization reactions contemplated herein include the conversion of n-haptane and/or n-octane to iso-heptanes and iso-octanes, butane to iso-butane, methylcyclopentane to cyclohexane, meta-xylene and/or ortho-xylene to paraxylene, 1-butene to 2-butene and/or isobutene, n-hexene to isohexenes, cyclohexene to methylcyclopentene, etc. Preferred catalysts comprise the Group VIII noble metal promoted zeolites wherein the ion-exchange capacity is satisfied partly by polyvalent metals and partly by hydrogen ions, e.g., Y zeolite and/or mordenite, wherein about 50–60 percent of the ion exchange capacity is satisfied by Group IIB, Group IIA, rare earth metals or the like, and about 5–30 percent by hydrogen ions.

In hydrocracking operations, the preferred catalysts comprise the same group of acid zeolites described above in connection with catalytic cracking, to which has been added about 0.1–20 weight-percent of one or more hydrogenating metals, preferably metals of Groups VIB and/or Group VIII, e.g., nickel, palladium, platinum, molybdenum and the like. Hydrocracking conditions generally include temperatures of about 600°–1000° F., hydrogen feed rates of about 1000 to about 20,000 s.c.f./bbl., space velocities of about 0.2–10, and pressures of about 500 to about 3,000, preferably about 1500 to about 2500 p.s.i.g. Primary feedstocks include straight run and/ or cracked gas oils, coker distillates, heavy naphthas and the like. Reduced crude oils, or crude oil residua may also be employed, preferably with excess added ammonia to further repress polymerization and coking. Hydrocracking temperatures are suitably adjusted so as to give the desired product such as gasolines, jet fuels, diesel fuels, propane-butane mixtures (LPG) and the like.

In catalytic dealkylation, the objective is to effect scission of paraffinic side chains from aromatic rings, without substantially hydrogenating the ring structure. To accomplish this objective, relatively high temperatures in the range of about 800°–1100° F. are employed at moderate hydrogen pressures of about 300–1000 p.s.i.g., other conditions being similar to those described above for catalytic hydrocracking. Preferred catalysts are of the relatively non-acidic type described above in connection with catalytic dehydrocyclization. Particularly desirable dealkylation reactions contemplated herein include the conversion of methylnaphthalene to naphthalene and toluene and/or xylenes to benzene.

In catalytic hydrofining, the primary objective is to promote the selective hydrodecomposition of organic sulfur and/or nitrogen compounds in the feed, without substantially affecting hydrocarbon molecules therein. For this purpose it is preferred to employ the same general conditions described above for catalytic hydrocracking, and catalysts of the same general nature described in connection with dehydrocyclization operations. Primary feedstocks include gasoline fractions, kerosenes, jet fuel fractions, diesel fractions, light and heavy gas oils, deasphalted crude oil residua and the like, any of which may contain up to about 5 weight-percent of sulfur and up to about 3, usually about 0.02 to about 1.5 weight-percent of nitrogen.

Similar conditions can be employed to effect hydrofining, e.g., denitrogenation and desulfurization, of hydrocarbon feeds containing substantial proportions of organonitrogen and organosulfur compounds. It is generally recognized that the presence of substantial amounts of such constituents markedly inhibits the activity of catalysts for hydrocracking. Consequently, it is necessary to operate at more extreme conditions when it is desired to obtain the same degree of hydrocracking conversion per pass on a relatively nitrogenous feed than are required with a feed containing less organonitrogen compounds. Consequently, the conditions under which denitrogenation, desulfurization and/or hydrocracking can be most expeditiously accomplished in any given situation are necessarily determined in view of the characteristics of the feedstocks, in particular the concentration of organonitrogen compounds in the feedstock. As a result of the effect of organonitrogen compounds on the hydrocracking activity of these compositions it is not at all unlikely that the conditions most suitable for denitrogenation of a given feedstock having a relatively high organonitrogen content with minimal hydrocracking, e.g., less than 20 volumes percent of fresh feed per pass, might be the same as those preferred for hydrocracking another feedstock having a lower concentration of hydrocracking inhibiting constituents, e.g., organonitrogen compounds. Consequently, it has become the practice in this art to establish the conditions under which a certain feed is to be contacted on the basis of preliminary screening tests with the specific catalyst and feedstock.

When employed as hydrocracking and hydrofining catalysts the compositions of this invention preferably comprise a Group VI-B or VIII hydrogenation component as previously described. However, there are generally other dissimilarities between catalyst compositions employed for each of the specific purposes due primarily to the relatively high cracking activity of the zeolite compositions of this invention. For example, where it is desirable to markedly reduce the molecular weight of a relatively high boiling feed to produce primarily gasoline range hydrocarbons, i.e., hydrocarbons of relatively high octane value boiling between about 185 and 400° F., it is generally preferable to employ catalysts containing about 40 to about 90 weight-percent of the zeolite composition. The remainder of the catalyst comprises the hydrogenation component and selected binder such as alumina, silica-stabilized alumina, magnesia, zirconia, silica-magnesia and other similar combinations. However, relatively lower cracking activities are preferred for the production of mid-barrel fuels. The same is true in hydrofining wherein it is not generally desirable to effect substantial degrees of hydrocracking. In such situations the catalyst will usually comprise less than about 30 weight-percent, preferably less than about 20 weight-percent of the zeolites herein described.

As mentioned above, the compositions of this invention can also be employed as a catalytic component of catalytic cracking catalysts. The catalysts designed for such applications preferably comprise a minor amount, e.g., less than 40 weight-percent, of the aluminosilicate suspended in a cracking matrix such as silica, zirconia or combinations thereof with binders such as alumina and alumina containing clays.

The several aspects of this invention are illustrated by the following examples which are presented only to illustrate and not to limit the scope of application or definition of these methods and compositions.

The first series of examples, Examples 1 through 7, illustrate the markedly improved hydrothermal stability of these catalysts and the effectiveness of the described methods in producing such compositions. Examples 1 through 5 demonstrate several of the better presently available thermal activation procedures and illustrate that the compositions of this invention far surpass those prepared by the methods heretofore considered most effective.

The starting material in each of Examples 1 through 4 was a commercially available ammonium zeolite Y having a sodium content equivalent to 2 weight-percent $Na_2O$, a cell constant of 24.71 A. as determined by X-ray diffraction, and an "R" value of 1.16.

Example 1

The powdered ammonium zeolite Y was heated in a porous alundum crucible to 900° F. in a stream of dry air. The elapsed time required to reach this final temperature was in excess of 30 minutes. The moisture content of the air injected into the furnace and the contact with the aluminosilicate was then increased by bubbling the air through water at 160° F. to expose the hot zeolite to about 5 p.s.i. water vapor pressure. This environment was maintained for 16 hours at 900° F. after which the catalyst was purged with dry air before cooling. The cool product was then hydrated by contact with water, dried and examined by X-ray diffraction. The resulting X-ray spectra showed that the aluminosilicate retained 85 percent of its original crystallinity. The aforementioned "R" value determined as the ratio of the (311) and (533) Miller indices to the sum of the (511) and (440) indices was shown to increase from 1.16 for the original aluminosilicate to 1.27 following this steaming and rehydration.

Example 2

The powdered aluminosilicate was positioned in a furnace preheated at 1000° F. in an open crucible. The sample approached the control temperature of 1000° F. within about 15 minutes and the aluminosilicate was retained at that temperature for 16 hours. The zeolite was then cooled, hydrated by contact with water and recalcined for 1 hour at 1000° F. X-ray spectra of the resultant product illustrated that it retained 70 percent of its original crystallinity and that the "R" value had increased from 1.16 to 1.30.

Example 3

In this example the aluminosilicate was treated by a conventional high temperature steaming procedure known to effect considerable improvement in both acid and hydrothermal stability. The ammonium zeolite Y powder was heated to 1200° F. in about 3 hours while suspended in the furnace in an open crucible. The zeolite was then steamed by exposure to 15 p.s.i. water vapor pressure by steam injection for 3 hours at about 1200° F. The aluminosilicate was then purged with dry air for 1 hour before cooling. X-ray diffraction of this cooled product indicated that it retained 78 percent of its original crystallinity and that the "R" value had been increased to 1.40 prior to rehydration.

Example 4

The zeolite product of Example 3 was placed in a preheated furnace at 1500° F. and rapidly heated to 1500° F. within about 15 minutes. The aluminosilicate was retained at that temperature for 3 hours after which it was allowed to cool to room temperature. X-ray spectra of the resulting product indicated that the crystallinity had increased from the value of 78 percent observed in Example 3 to 87 percent. It should be observed that this value of crystallinity is relative and was derived by comparison of the intensities of the (311), (440), (533), (555) and (642) Miller indices to those of a standard sample as previously described. Thus, the statement that the relative crystallinity increased is an expression of the fact that the summed intensities of the relevant Miller indices for this sample actually increased when subjected to the described activation. This unusual increase in relative crystallinity was at first considered to be anomalous. However, it was repeatedly observed on numerous occasions and always resulted from high temperature rapid calcination such as that described in this application and must therefore be attributed to that procedure. The calcined product recovered from this example had final "R" value of 1.41.

Example 5

The acid stabilities of the steamed and steam-calcined zeolites of Examples 3 and 4, respectively, were established by comparing four preparations at four different pH levels of each aluminosilicate. Sufficient 6 normal nitric acid was added to each slurry to prepare two series of tests—one of each aluminosilicate—with the following pH values: 2.7, 2.3, 2.2 and 1.7. Additional acid was added when necessary to counteract hydrolysis and maintain the pH values at the prescribed levels for about 15 minutes. The samples were then collected by centrifugation, washed, dried and analyzed by X-ray diffraction. The observed crystallinities in each case are illustrated in Table 1.

TABLE 1

| Acidity slurry pH | Zeolite Y, percent crystallinity | |
|---|---|---|
| | Exp. 3 | Exp. 4 |
| 2.7 | 79 | 87 |
| 2.3 | 17 | 73 |
| 2.0 | 0 | 80 |
| 1.7 | 0 | 49 |

The dramatic modification of aluminosilicate characteristics attributable to a rapid high temperature calcination is readily apparent from these observations. The aluminosilicate subjected to high temperature calcination had been so modified, at least with regard to those qualities which contributed to its acid stability, that it was essentially immune to acid attack at a pH of 2.0. That level of acidity was sufficient to completely destroy the crystallinity of the high temperature steamed aluminosilicate derived from the same starting material in Example 3.

The ability of the rapid high temperature calcination to transform an aluminosilicate into a highly stable composition is further illustrated by comparison of Examples 6 through 11. In each of these examples the starting aluminosilicate was the same ammonium zeolite Y having a sodium content equivalent to 2 weight-percent $Na_2O$ described in Example 1.

Example 6

Two portions of the powdered ammonium zeolite Y were heated to 840 and 1020° F., respectively, in a period of about 2 hours and retained at that temperature for an additional 2 hour period. X-ray diffraction spectra were obtained for each sample at the noted temperatures and showed that the predominance of the original crystallinity had disappeared at the higher temperature, i.e., 1020° F. After a 2 hour heatup period and holding 2 hours at 840° F. the aluminosilicate retained only 54% of its original crystallinity while the same heating schedule at 1020° F. reduced the residual crystallinity to only 13% of the original value. These results are summarized along with the results of Examples 7 through 11 in Table 2.

It is evidenced from the results obtained from Example 6 that slowly heating hydrogen zeolite Y to the noted temperatures produces some change in the zeolite which renders it markedly thermally unstable at temperatures of about 1000° F. and above. Even more severe degradation of physical structure results from slow calcination followed by rehydration as demonstrated in this example.

Example 7

Two samples of the same ammonium zeolite Y were heated to 950 and 1360° F., respectively, in about 2 hours. The calcined products were cooled, rehydrated by contact with water and analyzed by X-ray diffraction. The X-ray spectra thus obtained showed that the aluminosilicate heated to 950° F. retained only 12% of its original crystallinity whereas the sample heated to 1360° F. retained less than 2% of its crystallinity. The hydrothermal stability characteristics of these aluminosilicates are compared to those of aluminosilicates treated in accordance with this invention as summarized in Table 2.

Examples 8–11

Four samples of the same ammonium zeolite Y were heated in about 15 minutes to temperatures of 1000, 1300, 1500 and 1600° F., respectively. Each of these samples retained substantial crystallinity even after aging 16 hours at the noted temperatures, cooling and rehydrating by contact with water. These results are also summarized in Table 2.

TABLE 2

| Exp. No.[1] | Temp., °F. | Residual crystallinity, percent |
|---|---|---|
| 6 | 840 | 54 |
|   | 1,020 | 13 |
| 7 | 950 | 12 |
|   | 1,369 | 2 |
| 8 | 1,000 | 74 |
| 9 | 1,300 | 42 |
| 10 | 1,500 | 71 |
| 11 | 1,600 | 66 |

[1] Examples 7–11 were rehydrated before x-ray.

These results illustrate the dramatic improvements in zeolite chemical composition and/or physical structure rendered by the described calcination procedures. The rapidly calcined zeolites of Examples 8 through 11 remained predominately crystalline even upon rehydration after prolonged exposure to temperatures as high as 1600° F. In contrast, the aluminosilicates prepared by conventional prior art thermal activation at temperatures as low as 1369° F. were essentially completely destroyed.

Examples 12-15

The four catalysts of these examples were prepared by identical procedures with the exception of the thermal activation step. Each catalyst was formed from 60 weight-percent cobalt zeolite Y having a cobalt concentration equivalent to 6 weight-percent CoO, 5 weight-percent nickel determined as nickel oxide (NiO) and added as nickel nitrate and carbonate, 15 weight-percent molybdenum determined as $MoO_3$ added as ammonium heptamolybdate, and 20 weight-percent peptized boehmite alumina binder. In each instance a uniform powder was formed by mulling 300 g. of the cobalt zeolite Y with 61.9 g. $Ni(NO_3)_2 \cdot 6H_2O$, (25.7% NiO), and 14.3 g.

$NiCO_3$, (57.3% NiO). The mulling was then continued along with the addition of the molybdate in the form of 92 g. of $(NH_4)_6Mo_7O_{24} \cdot 4H_2O$ (82% $MoO_3$), until the combination was uniformly mixed. This composition was then formed into an extrudable paste by the addition of 385 g. of peptized boehmite (26% $Al_2O_3$) along with sufficient water to form an extrudable paste. The boehmite alumina was prepeptized by contacting with 0.8 m.e. of nitric acid per gram of alumina. In each instance the catalyst extrudates were finally calcined at 870° F. for 2 hours. As previously mentioned the only difference between the four catalysts of Examples 12 through 15 was in the form of the cobalt zeolite Y as determined by the thermal preactivation procedure employed.

Example 12

In this example the cobalt back exchanged ammonium zeolite Y containing 6 weight-percent cobalt determined as CoO was thermally activated prior to incorporation into the catalyst combination by heating slowly to a temperature of 850° F. in 2 hours and holding that temperature, i.e., 850° F. for 4 hours.

Example 13

The catalyst of this example was prepared by slowly heating the cobalt back exchanged ammonium zeolite Y to 1300° F. in 4 hours and holding at that temperature for 4 hours.

Example 14

This catalyst was prepared by rapid calcination upon heating the cobalt back exchanged ammonium zeolite Y to 1300° F. in about 15 minutes and holding at that temperature for 4 hours.

Example 15

This catalyst was prepared in the manner similar to that described in Example 14. The cobalt back exchanged ammonium zeolite Y was heated in 15 minutes in a preheated furnace to 1300° F. and held at that temperature for 16 hours. The temperature of the furnace was then raised to 1500° F. for an additional hour prior to cooling.

The results of these examples are summarized in Table 4.

TABLE 4

| Exp. No. | Catalyst base pretreat., Co zeolite Y calcination | Product collection, hrs. on stream | 185-400° F. (yield), vol. percent feed | Gasoline composition, p.p.m. Nitrogen | Gasoline composition, p.p.m. Sulfur | 400-500° gas oil, vol. percent feed | 500° F. plus bottoms Vol. percent feed | 500° F. plus bottoms API |
|---|---|---|---|---|---|---|---|---|
| 12 | Slow heat to 850° F. Hold 850° F. 4 hrs | 73-91 | 8.9 | 99 | 71 | 8.1 | 85.4 | 30.6 |
| 13 | Slow heat to 1,300° F. Hold 1,300° F. 4 hrs | 71-88 | 24.9 | 8 | 21 | 13.8 | 56.4 | 33.3 |
| 14 | Fast heat to 1,300° F. Hold 1,300° F. 4 hrs | 74-91 | 41.6 | 1 | 12 | 12.6 | 37.2 | 36.1 |
| 15 | Fast to 1,300° F. Hold 1,300° F. 16 hrs. Hold 1,500° F. 1 hr. | 24-50 | 44.8 | 1 | 6 | 12.6 | 28.2 | 37.1 |

Each of the catalysts prepared in this manner were employed to hydrocrack a straight run gas oil having the following characteristics:

TABLE 3

Straight Run Gas Oil Feed

| | | |
|---|---|---|
| Gravity | ° API | 25.6 |
| Sulfur | Wt. percent | 1.057 |
| Kjeldahl Nitrogen | do | 0.2049 |
| Basic Nitrogen | do | 0.0801 |
| D-1160 Engler 10 mm.: | | |
| IBP | ° F | 460 |
| 10% | ° F | 566 |
| 30% | ° F | 642 |
| 50% | ° F | 695 |
| 70% | ° F | 740 |
| 90% | ° F | 813 |
| Max. | ° F | 881 |

The reactor charges were presulfided in situ with a stream of 10% hydrogen sulfide in hydrogen while heating from room temperature to the reaction temperature of 760° F. The reactor was then pressured to 1000 p.s.i.g. prior to the introduction of the straight run gas oil feed. Reactor pressures, feed rates and hydrogen rates remained constant throughout each run at 1000 p.s.i.g. and 12,000 cf. $H_2$/bbl. respectively.

The hydrocracking catalyst bed was preceded by hydrotreating zone containing a catalyst composed of 3.4% NiO and 15% of $MoO_3$ on alumina catalyst. Space velocities for hydrotreating and hydrocracking were 4.0 and 2.0 LHSV respectively.

The marked superiority of the catalysts prepared in accordance with this invention as compared to prior art compositions is readily apparent from these observations. Conversion of the hydro-treated gas oil to gasoline product boiling between 185 and 400° F. obtained in Example 14 was 66% higher than that observed in Example 13. The catalysts in both of these operations were of exactly the same composition and were calcined at exactly the same temperature, the only difference being that the catalyst of Example 14 was subjected to the rapid calcination procedure of this invention. The performance of the catalyst of Example 15 was yet more favorable. A dramatic improvement in dehydrogenation and desulfurization activity was also apparent from these operations. The nitrogen content of the feedstock was essentially eliminated by the rapidly calcined catalyst whereas substantial amounts of nitrogen remained with each of the prior art catalysts. A sulfur content reduction of similar proportions was also apparent. Yet another favorable characteristic evidenced by the catalysts of this invention, i.e., the catalysts of Examples 14 and 15, was the increased API gravity of the 500° F.+bottoms fraction. This increase in API gravity of at least 10% in each instance is attributable to either molecular weight reduction or aromatics hydrogenation or both. As the boiling point of the bottoms fraction is fairly indicative of molecular weight, it is reasonable to conclude that the principal amount of the API gravity reduction was attributable to aromatics hydrogenation. The desirability of hydrogenating aromatics boiling within this temperature range in both gasoline and midbarrel fuel producing systems is well appreciated and need not be elaborated upon herein.

Examples 16–19

This series of operations was conducted to further illuminate the characteristics of these catalysts, particularly as compared to previously available catalysts. Each of the catalysts employed in Examples 16 through 19 contained a cobalt concentration equivalent to 6 weight-percent CoO and 1.8 weight-percent residual sodium determined as $Na_2O$. As in Examples 12 through 15, the catalysts of this series contained 60 weight-percent zeolite base, 5 weight-percent nickel determined as NiO, 15, weight-percent molybdenum determined as $MoO_3$, and 20 weight-percent peptized boehmite alumina binder. Each catalyst was prepared by mulling the active ingredients and extruding the resulting paste as previously described. The resulting extrudates were then dried and finely calcined at 850° F. Again the only difference between these several examples was the manner in which the cobalt back-exchanged ammonium Y base was thermally activated prior to combination in the catalyst mixture.

Example 16

In this example the cobalt back-exchanged ammonium zeolite Y was thermally activated by placing in a cold furnace and heating slowly to a temperature of 850° F. in 2 hours and retaining that temperature for 4 additional hours.

Example 17

In this example the catalyst was prepared from a cobalt back-exchanged ammonium zeolite Y which had been thermally activated by placing in a cold furnace and heating with agitation to 1300° F. in 3 hours and holding that temperature for 4 additional hours.

Example 18

This catalyst was prepared from a zeolite subjected to the rapid thermal activation procedures of this invention. The cobalt back-exchanged ammonium zeolite Y was placed in a furnace preheated to 1300° F. and heated to that temperature within one-half hour. The aluminosilicate was retained at that temperature for an additional 4 hours prior to cooling.

Example 19

In this example the catalyst was prepared in a manner similar to that described in Example 18 with several modifications. The cobalt-ammonium zeolite Y was placed in a furnace preheated to 1300° F. and brought to the furnace temperature within one-half hour. The zeolite was then held at 1300° F. for additional 16 hours after which the temperature was increased to 1500° F. for one hour prior to cooling.

As previously described with respect to Examples 12 through 15 the catalysts were presulfided in situ with a stream of 10% hydrogen sulfide in hydrogen while heating from ambient temperature to the reaction temperature of 700° F. The reactor was then pressured to 1000 p.s.i.g. prior to introduction of the straight run gas oil feed. Reactor temperature was maintained at 700° F. for 18 hours and then increased to 740° F. for the next 72 hours. Reactor pressures, feed rates and hydrogen feed rates remained constant throughout at 1000 p.s.i.g., 1 LHSV and 6000 cf.$H_2$/bbl. respectively.

The results of these several examples are summarized in Table 5.

TABLE 5

| Ex. No. | Zeolite base composition, cations | Cobalt zeolite Y base, precalcination procedure and conditions | X-ray diffraction Percent zeolite Y[a] | "R" value | Hydrocracking test Hrs. on stream, product °API | 400° conver., vol. percent feed |
|---|---|---|---|---|---|---|
| 16 | 6% CoO, 1.8% $Na_2O$ | Start with cold furnace. Heat with agitation to 850° F. in 2 hours. Hold 850° F. 4 hours. | 62 | 0.93 | 25–49 hrs., 34.6° API | 15 |
| 17 | 6% CoO, 1.8% $Na_2O$ | Start with cold furnace. Heat with agitation to 1,300° F. in 3 hours. Hold 1,300° F. 4 hours. | 52 | 1.29 | 23–47 hrs., 42.6° API | 40 |
| 18 | 6% CoO, 1.8% $Na_2O$ | Start with hot furnace. Heat with agitation to 1,300° F. in ½ hour. Hold 1,300° F. 4 hours. | 52 | 1.39 | 26–50 hrs., 48.7° API | 59 |
| 19 | 6% CoO, 1.8% $Na_2O$ | Start with hot furnace. Heat with agitation to 1,300° F. in ½ hour. Hold in 1,300° F. 16 hours. Increase temperature to 1,500° F. 1 hour. | 57 | 1.42 | 24–50 hrs., 48.5° API | 58 |

[a] Samples for X-ray measurements were hydrated over a saturated solution of magnesium chloride. The percent crystallinities are relative to a sodium zeolite Y standard.

The conversions achieved with the catalysts of Examples 18 and 19 prepared in accordance with this invention were roughly half again as great as the highest conversion obtained with the catalyst prepared by conventional thermal activation, i.e., the catalyst of Example 17. The significance of these distinctions is readily apparent. In addition, the API gravity of the product boiling below 400° F. was substantially higher with the catalyst of Examples 18 and 19 than was the case in Examples 16 or 17 again illustrating the greater hydrogenation activity of the rapidly activated compositions.

It is also of interest to note that the difference in crystallinity between the catalysts of Examples 16 through 19 does not serve to explain the difference in activity exhibited by those catalysts. On the contrary, the catalyst of Example 16 which had the highest residual crystallinity, i.e., 62% of original, effected only about one-fourth of the conversion obtained with the catalysts of Examples 18 and 19. The residual crystallinity of the catalyst of Example 17 was essentially identical to that of Example 18. However, there is a significant correlation between the hydrocarbon conversion activity of all of these catalysts and the "R" value calculated as previously described from specific Miller indices obtained from the X-ray spectra of each catalyst. On the basis of this correlation it seems reasonable to conclude that the variation in catalyst composition and structure reflected by "R" value increase upon activation are in part responsible for the markedly superior activity of the catalysts employed in Examples 18 and 19. However, the characterization provided by the characteristic Miller index ratio is obviously not comprehensive of all the qualities contributing to the noted catalyst properties. For example, the steamed catalyst of Example 3 had a relatively high "R" value of 1.4. Nevertheless, the stability of that product was markedly inferior to that of the rapidly calcined catalyst as shown in Table 1.

Examples 20–27

These examples illustrate the effect of the described rapid thermal activation on the crystallinity and "R" values of several other forms of aluminosilicates. Included in these examples are ammonium back exchanged sodium Y, nickel Y zeolite, manganese and cerium Y zeolites and cerium X zeolite. Each of these aluminosilicates was heated in powdered form in a preheated furnace to temperatures ranging from 1000 to 1600° F. Each sample was dried at 220° F. prior to introduction into the furnace. The samples were brought to the prescribed temperatures within about 15 minutes and held at the noted temperature for 16 hours.

All X-ray diffraction measurements were made with samples which had been dehydrated over a solution of saturated magnesium chloride. The X-ray source in each case was Cu-K alpha radiation, nickel filtered. Each spectra was obtained at a sample width of 20 millimeters, diversion angle of 1°, a focal length of 170.0 millimeters, a scan rate of 1°-26″ per minute recorded with a one second time constant. The crystallinity values reported are relative crystallinities determined by comparing the summed X-ray intensities of the (331), (440), (533), (555) and (642) Miller indices for the sample to the sum of the same indices for a highly crystalline standard of a similar zeolite. The resulting ratio is conventionally employed as a convenient expression of relative crystallinity although it may not take into account all relevant distinctions between the standard and sample in every situation. The operating temperatures, "R" values and relative crystallinities determined by X-ray diffraction are summarized in the following table.

TABLE 6

| Ex. No. | Miller indices approx. angle 20 spacing A. form | Temp., °F. | "R" value | Percent relative crystallinity |
|---|---|---|---|---|
| 20 | NaY, 13% Na₂O | 220 | 1.28 | 1.00 |
|  |  | 1,000 | 1.29 | 0.95 |
|  |  | 1,300 | 1.61 | 0.89 |
|  |  | 1,500 | -------- | 0.00 |
| 21 | H-Y (NH₄Y), 1.8% Na₂O | 220 | 0.88 | 1.00 |
|  |  | 1,000 | 1.23 | 0.74 |
|  |  | 1,300 | 1.37 | 0.42 |
|  |  | 1,500 | 1.47 | 0.71 |
|  |  | 1,600 | 1.53 | 0.66 |
| 22 | MgY, 6.8% MgO, 1.0% Na₂O | 220 | 1.19 | 1.00 |
|  |  | 1,000 | 1.08 | 0.84 |
|  |  | 1,300 | 1.20 | 0.80 |
|  |  | 1,500 | 1.39 | 0.70 |
|  |  | 1,600 | 1.48 | 0.42 |
| 23 | CoY, 6.0% CoO, 1.8% Na₂O | 220 | 1.15 | 1.00 |
|  |  | 1,000 | 1.06 | 0.94 |
|  |  | 1,300 | 1.26 | 0.73 |
|  |  | 1,500 | 1.43 | 0.80 |
|  |  | 1,600 | -------- | 0.00 |
| 24 | NiY, 5.8% NiO, 1.7% Na₂O | 220 | 1.21 | 1.00 |
|  |  | 1,000 | 0.99 | 0.84 |
|  |  | 1,300 | 1.17 | 0.75 |
|  |  | 1,500 | 1.58 | 0.77 |
|  |  | 1,600 | -------- | 0.00 |
| 25 | MnY, 3% MnO, 1.1% Na₂O | 220 | 1.20 | 1.00 |
|  |  | 1,000 | 1.01 | 0.86 |
|  |  | 1,300 | 1.23 | 0.71 |
|  |  | 1,500 | 1.41 | 0.76 |
|  |  | 1,600 | 1.46 | 0.60 |
| 26 | CeY, 11% Ce₂O₃, 1.8% Na₂O | 220 | 1.56 | 1.00 |
|  |  | 1,000 | 1.61 | 0.89 |
|  |  | 1,300 | 1.59 | 0.87 |
|  |  | 1,500 | 1.91 | 0.78 |
|  |  | 1,600 | 1.84 | 0.59 |
| 27 | CeX, 24.4% Ce₂O₃, 1.1% Na₂O | 220 | 3.2 | 1.00 |
|  |  | 1,000 | 3.4 | 0.75 |
|  |  | 1,300 | 3.6 | 0.52 |
|  |  | 1,500 | 3.6 | 0.58 |
|  |  | 1,600 | 0 | 0.00 |

Example 28

2200 grams of ammonium zeolite-Y containing 53% water was slurried in 1000 millimeters of water and mixed with 500 millimeters of 1.0 molar nickel nitrate solution. The mixture was stirred and heated at about 200° F. for 2 hours. The zeolite was then collected by filtration, washed and resuspended in a second exchange medium. This exchange procedure was repeated three times. The resultant product was then collected by filtration, dried at 200° F. and analyzed. The product contained 1.7% sodium as Na₂O and 5.8 nickel as NiO on an anhydrous basis and exhibited a relative crystallinity of 98% and an "R" value of 1.11. A sample of this zeolite was placed in a preheated furnace and heated to 850° F. in about 20 minutes and held at 850° F. for a period of 4 hours.

The relative crystallinity of the calcined product had decreased to 80% while the "R" value had decreased nominally to 1.09. This observation is in agreement with similar results observed in calcining other compositions at relatively low temperatures. It is again apparent that calcination at relatively low temperatures, i.e., below about 900° F., does not result in substantial increase in "R" value.

Example 29

The procedure of Example 28 was repeated by introducing a sample of the nickel ammonium zeolite into a furnace preheated to 1400° F. and heating the zeolite to that temperature in about 30 minutes. The zeolite was then retained at 1400° F. in the furnace for a total period of 4 hours. The relative crystallinity of this material had been reduced to 68% whereas the "R" value had increased to 1.53.

Example 30

Twenty-two hundred grams of the ammonium zeolite-Y described in Example 28 containing 53% water was slurried in 1000 millimeters of water and mixed with 500 millimeters of one molar CeCl₃. The mixture was contacted with agitation at 200° F. for 2 hours. The exchanged zeolite was then collected by filtration, washed and resuspended. The exchange procedure was repeated 3 times as described in Example 28. The product was then collected by filtration, dried at 200° F. and analyzed. The resultant product contained 1.8% sodium as Na₂O and 11.0% Ce₂O₃ on an anhydrous basis. A sample of this material was placed in the furnace preheated to 850° F. and brought to that temperature in about 20 minutes or less. Calcination was continued for a total period of 4 hours at 850° F.

The uncalcined exchanged zeolite had an "R" value of 1.32 and a relative crystallinity of 56%. In contrast, the calcined zeolite had a relative crystallinity of 43% and an increased "R" value of 1.67. The dramatic increase in "R" value for the cerium zeolite at the relatively low calcination temperature of 850° F. indicates that the temperature necessary to effect a substantial increase in "R" value for cerium zeolites is somewhat lower than that necessary with the nickel analog.

Example 31

The procedure of Example 30 was repeated by placing a sample of the cerium exchanged ammonium zeolite in an oven preheated to 1400° F. and bringing the zeolite to that temperature in about 30 minutes. Calcination was continued at 1400° F. for a total period of 4 hours. The resultant composition exhibited a relative crystallinity of 40% and an increased "R" value of 1.85.

Examples 32-35

The compositions of Examples 28 through 31 were compounded with nickel and molybdenum, sulfided and employed to convert the straight run gas oil described in Examples 12 through 15 supra. The described mulling was conducted in each instance under conditions sufficient to provide a final catalyst composition containing 5 weight-percent NiO, 15 weight-percent MoO₃, 20 weight-percent alumina and 16 weight-percent of the corresponding zeolite on an anhydrous basis. The performance of each of these compositions, including conversion of feed to 185-400° F. gasoline, denitrogenation and desulfurization, are summarized in Table 7.

TABLE 7

| Example | Catalyst | R[3] | 185-400° F., yield, percent ff. | Gasoline,[1] nitrogen, p.p.m.[2] | Sulfur, p.p.m.[2] |
|---|---|---|---|---|---|
| 32 | 28 | 1.09 | 15.8 | 65 | 25 |
| 33 | 29 | 1.53 | 57.2 | 0.1 | 6 |
| 34 | 30 | 1.67 | 23.5 | 15 | 27 |
| 35 | 31 | 1.85 | 33.0 | 3 | 7 |

[1] Data were obtained after the catalyst had been lined out for 50 to 67 hours. Conversions were based on averages for that run period.
[2] 185-400° F. gasoline fraction.
[3] Calcined base.

These results are summarized in the figure along with the results of Examples 16 through 19. From all of these observations it is readily apparent that the rapid calcination procedure of this invention not only dramatically improves the physical and chemical characteristics of the catalyst per se but results in dramatic increases in hydrocarbon conversion activity including hydrocracking, denitrogenation and desulfurization activity.

Example 36

This example is illustrative of the manner in which the described catalysts can be employed to catalytically crack hydrocarbons. A suitable cerium exchanged zeolite L obtained as described in Example 30. Twenty grams of this zeolite are calcined by heating to a temperature of 1000° F. in 30 minutes and holding at that temperature for four hours. The zeolite is then admixed with 380 grams of a silica-alumina hydrogel on a dry weight basis having a $SiO_2/Al_2O_3$ ratio of 3. The gel can then be set, dried at 230° F. and calcined at 1000° F. for 2 hours.

The calcined composition is then contacted with a heavy gas oil at 950° F. and a space velocity of 3 v./v./hr. at a pressure of 20 p.s.i.g. in a circulating fluid bed system to convert the feed to lower boiling products including mid-barrel and gasoline fractions.

What is claimed is:

1. The method of preparing a hydrocarbon conversion catalyst containing an aluminosilicate zeolite characterized by increased hydrocarbon conversion activity including the steps of thermally activating an unactivated form of said zeolite by heating from a temperature below about 500° F. to a temperature above about 900° F. within about one-half hour or less and retaining said zeolite at a temperature in excess of about 900° F. for a period of at least about 10 minutes sufficient to thermally activate said zeolite in the substantial absence of hydrocarbons.

2. The method of claim 1 wherein said zeolite is heated to said temperature at an average rate of at least about 30° F. per minute.

3. The method of preparing a zeolite-containing catalyst having superior hydrogenative conversion activity including the steps of thermally activating an unactivated form of said zeolite by heating said zeolite from a temperature below about 500° F. to at least about 900° F. within about one-half hour or less and retaining said zeolite at a temperature of at least about 900° F. for a period sufficient to thermally activate said zeolite and combining with said zeolite after said activation a catalytically active amount of a hydrogenation component selected from the Periodic Group VI–B and VII metals, oxides and sulfides.

4. The method of claim 1 wherein the $SiO_2/Al_2O_3$ ratio of said zeolite is at least about 2, the alkali metal content of said zeolite is equivalent to less than about 6 weight-percent of the corresponding oxide, said zeolite contains at least one cation selected from hydrogen, ammonium and the nonalkali metal cations and is heated to a temperature of at least about 1000° F. in less than about 20 minutes.

5. The method of claim 4 wherein said zeolite is heated to said temperature of at least about 1000° F. and below its thermal decomposition temperature from a temperature below about 500° F. at an average rate of at least about 30° F. per minute and is retained at said temperature for at least about 20 minutes.

6. The method of claim 1 wherein said zeolite has a $SiO_2/Al_2O_3$ ratio of at least about 3, a sodium content equivalent to less than about 3 weight-percent $Na_2O$ and contains at least one other cation selected from hydrogen, ammonium and the metal cations of Groups II, IV, V, VI, VII and VIII and is heated to a temperature within about 200° F. of its thermal decomposition temperature and below said decomposition temperature within a period of about 30 minutes or less.

7. The method of claim 6 wherein said zeolite is heated to a temperature of at least about 1000° F. in a period of less than about 20 minutes and is retained at said temperature for a period of at least about 20 minutes.

8. The method of claim 1 wherein said zeolite is substantially free of any Group VI–B or Group VIII noble metal constituents prior to said heating and the thus treated zeolite is combined with a catalytically active amount of at least one component selected from the metals, oxides and sulfides of Groups IV–B, VI–B and VIII.

9. The method of claim 3 wherein said zeolite is selected from zeolites Y, T, A, L, Omega and mordenite having $SiO_2/Al_2O_3$ ratios of at least about 3 and sodium contents equivalent to less than about 3 weight-percent $Na_2O$ and is heated to a temperature within about 200° F. of its thermal decomposition temperature within about 20 minutes and retained at said temperature for a period of at least about 30 minutes.

10. The composition prepared by the method of claim 1.
11. The composition prepared by the method of claim 3.
12. The composition prepared by the method of claim 3.
13. The composition prepared by the method of claim 9.

14. The composition of claim 12 wherein said zeolite is a faujasite-type zeolite having a silica-to-alumina ratio of at least about 3 and an alkali metal content below about 3 weight percent determined as the corresponding oxide, and wherein said hydrogenation component is selected from molybdenum, tungsten and the Group VIII noble metals, oxides and sulfides.

15. The composition of claim 14 wherein said zeolite is at least partially in the ammonium exchanged form prior to said activation.

16. The method of claim 3 wherein said zeolite is selected from zeolites A, T, L, Omega, mordenite and faujasite-type zeolites having silica-to-alumina ratios of at least about 3 and alkali metal contents corresponding to less than about 3 weight percent of the alkali metal oxide, and the activated zeolite is combined with said hydrogenation component and a refractory inorganic oxide to form an aggregate catalyst particle.

17. The hydrocarbon conversion catalyst prepared by the method of claim 16.

References Cited

UNITED STATES PATENTS

| | | | |
|---|---|---|---|
| 3,197,398 | 7/1965 | Young | 252—455 Z |
| 3,391,088 | 7/1968 | Plank et al. | 252—455 Z |
| 3,393,147 | 7/1968 | Dwyer et al. | 208—120 |
| 3,407,148 | 10/1968 | Eastwood et al. | 252—455 Z |
| 3,459,680 | 8/1969 | Plank et al. | 252—455 Z |
| 3,542,670 | 11/1970 | Erickson et al. | 208—120 |
| 3,558,476 | 1/1971 | Robbins, Jr. et al. | 252—455 Z |
| 3,617,496 | 11/1971 | Bryson et al. | 208—120 X |
| 3,649,521 | 3/1972 | Martin | 208—120 |
| 3,669,903 | 6/1972 | Bourgu et al. | 252—455 Z |

CARL F. DEES, Primary Examiner

UNITED STATES PATENT OFFICE
CERTIFICATE OF CORRECTION

Patent No. 3,842,016　　　　　　　　　Dated October 15, 1974

Inventor(s) Dean Arthur Young

It is certified that error appears in the above-identified patent and that said Letters Patent are hereby corrected as shown below:

Column 19 (Claim 3) line 50, "VII" should read --VIII---.
Column 20 (Claim 11) line 28, "claim 3" should be --claim 4--.

Signed and sealed this 10th day of December 1974.

(SEAL)
Attest:

McCOY M. GIBSON JR.　　　　　C. MARSHALL DANN
Attesting Officer　　　　　　　Commissioner of Patents